United States Patent [19]
Whittle

[11] Patent Number: 4,787,577
[45] Date of Patent: Nov. 29, 1988

[54] CLOSURE SYSTEMS
[75] Inventor: Cornelius R. Whittle, Renton, Wash.
[73] Assignee: The Boeing Company, Seattle, Wash.
[21] Appl. No.: 789,499
[22] Filed: Oct. 21, 1985
[51] Int. Cl.$^4$ .............................................. B64C 1/14
[52] U.S. Cl. .............................. 244/129.4; 244/118.2; 244/129.5; 49/463; 49/380; 248/501
[58] Field of Search ............... 244/129.4, 129.5, 118.2; 49/463, 465, 380; 114/117, 120; 248/501; 410/105

[56] References Cited
U.S. PATENT DOCUMENTS

| | | | |
|---|---|---|---|
| 2,896,277 | 7/1959 | Halligan | 49/465 |
| 3,373,527 | 3/1968 | Olsson | 49/222 |
| 4,154,416 | 5/1979 | Bruce et al. | 244/129.5 |
| 4,213,593 | 7/1980 | Weik | 248/501 |

OTHER PUBLICATIONS

*Aviation Week & Space Technology,* Sep. 26, 1983.

Primary Examiner—Joseph F. Peters, Jr.
Assistant Examiner—Lynn M. Fiorito
Attorney, Agent, or Firm—Hughes, Cassidy & Multer

[57] ABSTRACT

Closure systems particularly intended for high speed aircraft and designed with an inwardly opening closure which can be removed during flight. A wheel or roller is provided at the bottom of the closure so that it can be readily moved to an out-of-the-way storage location by a single person. The closure is supported at its lower end by a floor-mounted bracket which can be detached to provide a clear pathway to the doorway which the closure is designed to block.

13 Claims, 3 Drawing Sheets

CLOSURE SYSTEMS

TECHNICAL FIELD OF THE INVENTION

The present invention relates to closure systems and, more particularly, to novel, improved systems of that character with an inwardly opening closure which can be relocated in a location removed from the opening it is designed to block to thereby facilitate movement through that opening.

At the present time the most important application of my invention involves an aircraft door which can be opened during flight and then moved to a location remote from the doorway it is provided to block to facilitate the deployment of equipment, parachutists, etc., through the doorway.

The principles of the present invention will be developed primarily by relating them to the just-identified application of my invention. It is to be understood that this is being done for the sake of convenience and clarity and is not intended to limit the scope of the invention as defined in the appended claims.

BACKGROUND OF THE INVENTION

A demand exists for jet aircraft doors which can be opened during flight for the deployment of, for example, paratroopers and other chutists, rescue equipment, disaster-relief items, and other supplies and equipment. The alternative, removing the door before take-off, is impractical as the compartment sealed by the door could neither be heated nor pressurized during flight.

Many jet aircraft doors open outwardly. They cannot be opened during flight because, at the high speeds at which jet aircraft travel, the door would be torn away by the air rushing past the aircraft.

Aircraft doors which can be opened during flight have been proposed. One such proposal involves a track-mounted inwardly opening door. This arrangement has the decided disadvantage that the track mechanism takes up considerable valuable space in the interior of the aircraft. The track mechanism also impedes movement of men and material in its vicinity.

Another heretofore made proposal involves a plug fitting door which is latched to the fuselage of the aircraft at its upper end and coupled at its lower end to a bracket permanently mounted on the aircraft floor. This arrangement has the disadvantage that two men are required to remove and carry away the door. Also, the floor-mounted bracket can interfere with the movement of supplies, equipment, personnel, etc. through the doorway.

SUMMARY OF THE INVENTION

I have now invented a novel, improved closure system intended primarily for jet aircraft. That system has a door which can be removed and stowed in an out-of-the-way location during flight by a single person. My novel closure system, furthermore, does not employ tracks, permanently mounted brackets or other components which protrude above the floor of the aircraft and would thereby interfere with the movement of equipment, supplies, or personnel through the aircraft's doorway.

In general, the closure system I have invented and disclosed herein includes an inwardly opening, plug-fitting door coupled by a conventional catch to the fuselage of the aircraft in which it is installed at the upper end of the door.

The lower end of the door carries a wheel or roller, and that end of the door is detachably supported in a bracket latched to the floor of the aircraft.

The door is quickly and simply removed for transfer to an out-of-the-way location by opening the catch at the upper end of the door and rotating the door inwardly about horizontally extending, door-carried lugs seated in the door-supporting bracket until the roller is lowered into engagement with the floor of the aircraft. Continued inward and downward rotation of the door cams the lugs by which it is supported upwardly and out of recesses in the bracket in which they are seated, allowing the operator to roll the door away to, and stow it in, an appropriate out-of-the-way location. Latches incorporated in the door-supporting bracket are then released, allowing the latter to be removed and stowed away to provide a clear pathway to the aircraft's doorway. In the location in which it is stored the brack may be used to secure in place the lower end of the door also removed to that location for storage.

Thus, this novel closure system simply and inexpensively solves the problem of furnishing access through the doorway of a high-speed aircraft during flight. This is accomplished in a manner which does not require that permanently mounted tracks, brackets, or other components be located in the aircraft's interior, and a clear pathway to the aircraft's doorway is provided when the door is removed. Furthermore, the door can be easily removed, stowed, and returned to its doorway blocking position by a single person.

OBJECTS OF THE INVENTION

From the foregoing, it will be apparent to the reader that one important and primary object of the present invention resides in the provision of novel, improved closure systems for high speed aircraft, those systems including a door that can be removed during flight.

Other also important, but more specific, objects of the invention reside in the provision of closure systems as aforesaid:

which are simple and relatively inexpensive;

which allow the door to be removed and stowed in an out-of-the-way location by a single person;

which do not consume large amounts of interior space with tracks, brackets, or other door-supporting or handling mechanisms;

which offer a clear path to the aircraft's doorway;

which utilize a wheel to facilitate the removal of the door to the out-of-the-way location in which it is stowed;

which employ a detachable door-supporting bracket that can be readily removed from the floor of the aircraft and which can, furthermore, be employed to support the door at the location where it is stowed.

Other important objects and features and additional advantages of the invention will be apparent to the reader from the foregoing, from the appended claims, and as the ensuing detailed description and discussion of my invention proceeds in conjunction with the accompanying drawing.

DETAILED DESCRIPTION OF A PRESENTLY PREFERRED EMBODIMENT

Figure 1:
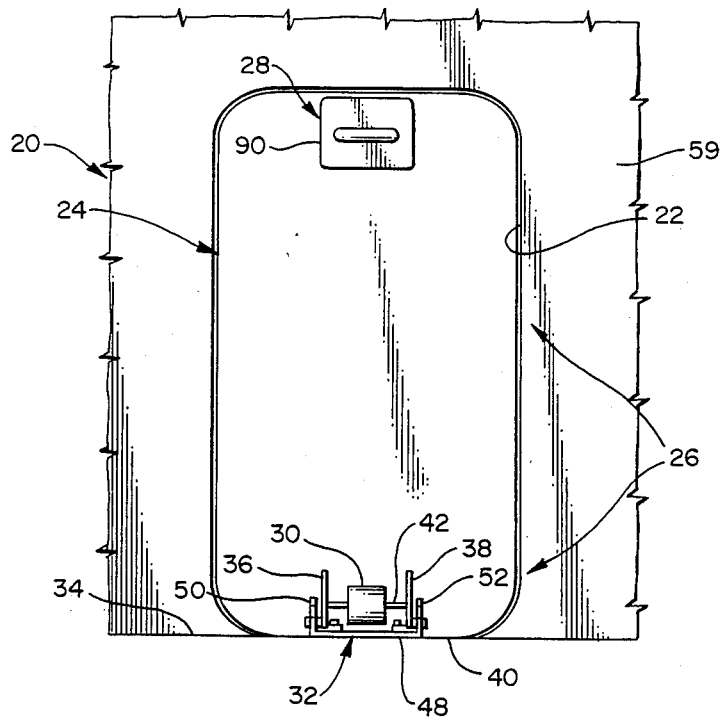
FIG. 1 is a partial view from its interior of an aircraft fuselage having a doorway which is blocked by the door of a closure system embodying, and constructed in accord with, the principles of the present invention.

Referring now to the drawing, FIG. 1 depicts the fuselage 20 of a high-speed aircraft. That fuselage has a doorway 22 which can be closed or blocked by the plug-fitting door 24 of a closure system constructed in accord with, and embodying, the principles of the present invention and identified by reference character 26.

Aside from door 24, the major components of closure system 26 include a catch mechanism 28 for latching the upper end of door 24 to the fuselage 20 of the aircraft, a wheel 30 which makes door 24 mobile and allows it to be rolled to an out-of-the-way storage location by a single person, and a door-supporting bracket 32 removably latched to the floor 34 of the aircraft. This bracket supports the lower end of door 24 from the floor of the aircraft in the illustrated position in which that door blocks doorway 22.

The illustrated upper catch 28 is the one conventionally employed on the doors of a Boeing 737 twinjet. For this reason that component of closure system 26 will not be disclosed herein. The other components of the closure system, except for the door iself (which can be of any desired construction), are described below.

Figure 2:
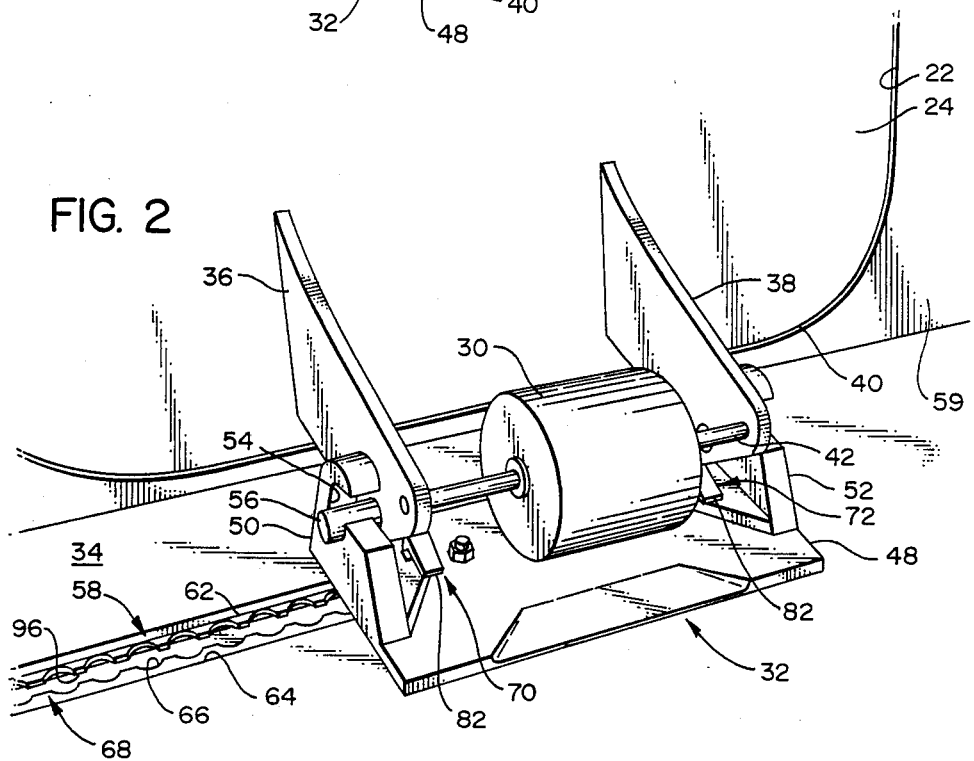
FIG. 2 is a perspective view of the aircraft floor and the lower end of the door incorporated in the closure system; this view shows the details of a rotatable wheel or roller which facilitates the movement of the door to an out-of-the-way storage location and a floor-mounted, detachable bracket which is employed to support the lower end of the door: (a) in its closed position across the aircraft's doorway and, (b) optionally, at the location in which the door is stored.

Turning now to FIG. 2, two parallel, spaced apart wheel supports 36 and 38 are bolted or otherwise attached to door 24 at the lower end 40 thereof.

Journalled in supports 36 and 38 is a horizontally extending axle 42 for wheel 30. Door 24 can be rolled on this wheel between the doorway obstructing or blocking position shown in FIG. 1 to the out-of-the-way storage position shown in FIG. 7 and identified by reference character 46.

Referring now to FIG. 2, the detachable, floor-mounted bracket 32 has a platform 48 with vertically extending stanchions 50 and 52 at the opposite ends thereof.

Figure 3:
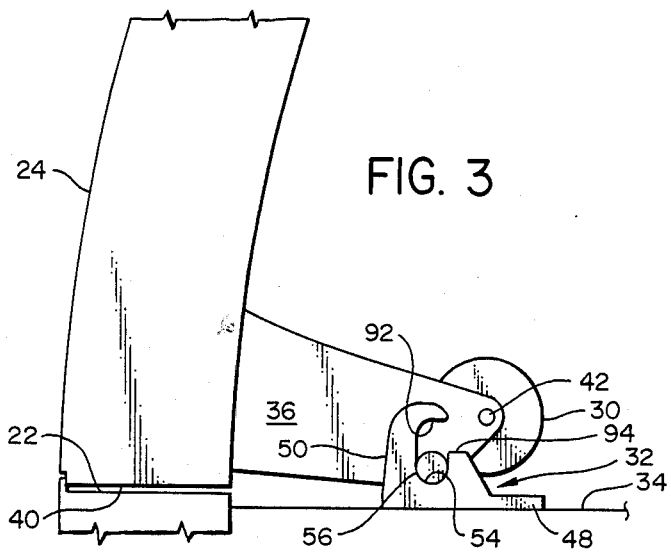
FIG. 3 is a side view of the door, its mobility imparting roller, and the detachable, door-supporting bracket with the door in its "closed" position.
Figure 4:
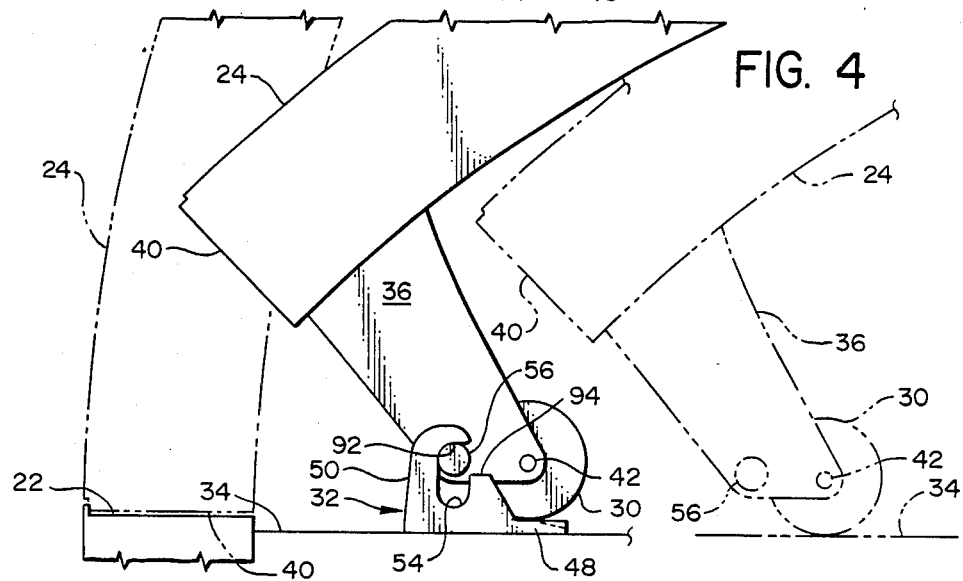
FIG. 4 is a view similar to FIG. 3 but with the door rotated inwardly to lower the roller to the aircraft floor and to release the door from its supporting bracket (solid lines) and with the door then rolled away from the doorway of the aircraft to permit movement through the latter and with the door-supporting bracket removed to furnish a clear path to the doorway (phantom lines)

As shown in FIG. 2, and also in FIGS. 3 and 4, upwardly extending, inwardly opening recesses 54 (only one is illustrated) are formed in stanchions 50 and 52. These recesses are configured to provide seats for horizontally extending door supporting, lugs 56 (only one shown). These lugs are fixed to the door mounted, wheel-supporting brackets 36 and 38 and extend in opposite directions from those supports along a horizontal axis parallel to, but spaced from, the horizontal axis of rotation of wheel-supporting axle 42.

As shown in FIG. 2, a bracket retaining track 58 is mounted in the floor 34 of the aircraft parallel to vertically extending fuselage wall 59.

Figures 5, 6:
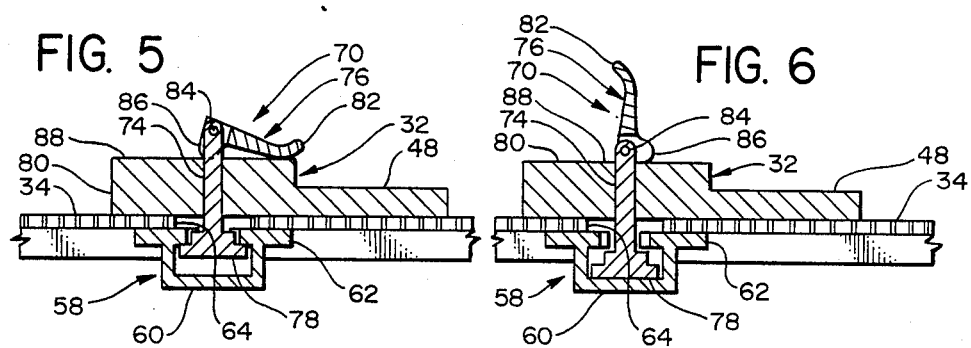
FIG. 5 is a vertical section through the door-supporting bracket and one of two latches incorporated in that bracket with the latter in a "closed" configuration to latch the bracket to the floor of the aircraft.
FIG. 6 is a view similar to FIG. 5 but with the latch opened, allowing the door-supporting bracket to be removed from the floor of the aircraft for storage in an out-of-the-way location so that there will be a clear path to the aircraft doorway.

Referring now to both FIG. 2 and FIG. 5, track 58 has an upwardly opening, C-Sectioned channel 60 surmounted by a keeper which is a flat, horizontally oriented keyway 62. The track is mounted immediately subjacent the floor 34 of the aircraft and is reachable through an elongated slot 64 in that floor.

Openings 66 of relatively larger diameter are alternated with slotted detents 68 in the keyway 62 of track 58.

Aircraft of the type for which the closure systems disclosed herein are particularly designed will typically have a track of the character and orientation just described as original equipment. The illustrated arrangement, for example, is that utilized by Boeing Commercial Aircraft Company to lock passenger seats in place.

Referring still to FIGS. 2 and 5, door-supporting bracket 32 also includes two identical latching mechanisms 70 and 72 for detachably coupling the bracket to the floor-mounted track 58 just described.

Latching mechanism 70, shown in detail in FIG. 5, includes a stem 74, a latch actuator 76, and a retainer 78.

Stem 74 is mounted for up-and-down, vertical sliding movement in a horizontal ledge 80 which is integral with, and extends toward the center of bracket platform 48 from, the stanchion 50 at the end of bracket 32.

Retainer 78 is integral with the lower end of stem 74 and is dimensioned so that it can move freely upward through keyway 62 of track 58 when it is positioned opposite one of the enlarged openings 66 through the keyway but will be trapped below and against a keyway detent 68 when it is located opposite one of those detents 68.

Latch actuator 76 includes a lever 82 fixed by a pivot pin 84 to the upper end of stem 74. Formed at that end of lever 82 is a downwardly extending cam 86. That cam is engageable with the upper surface 88 of ledge 80 to displace stem 74 upwardly and clamp retainer 78 against the lower side of keyway 62, thereby securely fixing bracket 32 to track 58 when lever 82 is rotated in a clockwise direction from the "unlatch" position shown in FIG. 6 to the "latch" position of FIG. 5.

Referring now to FIG. 1, the first step in removing door 24 to permit movement through doorway 22 is to raise handle 90 of catch mechanism 28. This releases catches (not shown) which engage the door casing. Door 24 can subsequently be pulled inwardly and downwardly into the aircraft's interior.

Raising handle 90 also equalizes the pressure in the aircraft fuselage with the ambient pressure through an also conventional port so that artifacts in the aircraft and/or persons therein will not be thrown about the compartment or blown out through the doorway when door 24 is opened.

Door 24 is rotated inwardly and downwardly in a clockwise direction from the doorway blocking position shown in FIG. 3 to the position shown in full lines in FIG. 4 after the catches are released. As this is done, wheel-supporting brackets 36 and 38 rotate in stanchions 50 and 52 of door-supporting bracket 32, lowering wheel 30 to the floor 34 of the aircraft. Continued clockwise, inwardly and downwardly rotation of the door pivots supports 36 and 38 about axle 42, camming lugs 56 upwardly in recesses or slots 54 until the lugs engage the upper ends 92 of those slots. That aligns lugs 56 with the horizontal, inwardly facing openings 94 to recesses 54 and alerts the operator that this position has been reached and that door 24 can consequently be rolled away from bracket 32.

Figure 7:
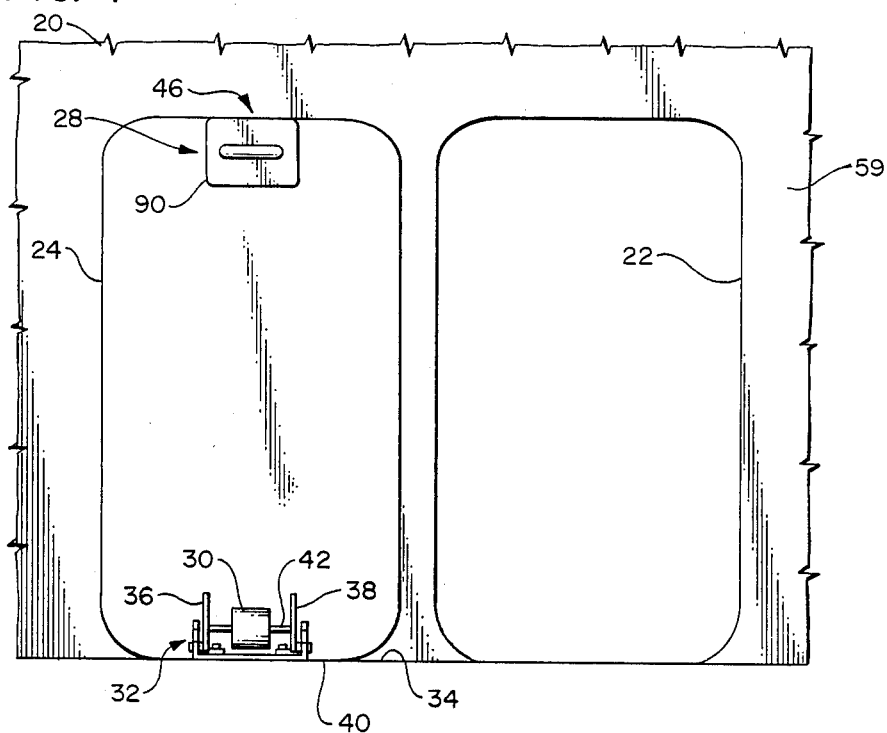
FIG. 7 is a view similar to FIG. 1, but showing the doorway of the aircraft open and the door stowed in its out-of-the-way location.

Next, as suggested by the phantom lines in FIG. 4, door 24 is rolled on wheel 30 to an out-of-the-way storage position such as that mentioned above and identified by reference character 46 in FIG. 7.

Once door 24 has cleared bracket 32, the levers 82 of latches 70 and 72 are rotated counterclockwise to the position shown in FIG. 6, allowing the retainers 78 at the lower ends of stems 74 to drop away from detents 68 of keyway 62 and release the frictional connection between the retainers and the detents. Bracket 32 is then slid to the left (or right) as shown in FIG. 2 with latch stems 74 sliding through the slots 96 in detents 68 to align retainers 78 with the openings 66 in keyway 62 through which they are dimensioned to pass. Bracket 32 is then lifted off track 58 with retainers 78 moving up through openings 66 and moved out of the way to provide a clear path to doorway 22.

As shown in FIG. 7, bracket 32 can be moved to location 46 and reinstalled by reversing the sequences of bracket removal steps just described to support the lower end of door 24 at that location. There will also be, at that location, a mechanism (not shown) which is cooperable with the catch mechanism 28 of door 24 to secure the upper end of the door in place. This mechanism will typically be attached to the aircraft's overhead storage bins if the aircraft is so equipped. Otherwise, the catch associated mechanism will simply be mounted on the wall 59 of the fuselage.

It is also to be understood that a second door-supporting bracket like that described above or even a different type of mechanism can be employed to support the lower end of door 24 at the storage location rather than installing there the bracket employed at doorway 22.

Plug-fitting door 24 is reinstalled in the position shown in FIG. 1 to block doorway 22 by reversing the sequence of steps just described; i.e., by: (1) pulling handle 90 of catch mechanism 28 upwardly to release the upper end of the door, (2) rotating the door inwardly and downwardly about lugs 56 to lower wheel 30 to the floor 34 of the aircraft and release it from bracket 32, (3) releasing the latter from the track 58 (or the like) at location 46 and reinstalling the bracket at the location shown in FIG. 2, (4) rolling door 24 on wheel 30 to the location shown in that figure and in FIG. 4 until door-supporting lugs 56 are engaged with stanchions 50 and 52, (5) rotating the door upwardly and outwardly until it is positioned across doorway 22 as shown in FIG. 3, and (6) letting catch mechanism 28 automatically lock the upper end of the door in place.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description; and all changes which come within the meaning and range of equivalency of the claims are therefore intended to be embraced therein.

What I claim as my invention is:

1. A closure system for a structure having a vertically extending wall with a doorway therein and floor means extending from said wall means at the lower edge thereof, said closure system comprising: a closure for blocking said doorway, bracket means for detachably securing the lower end of said closure to said floor means with said closure blocking said doorway, and wheel means fixed to the lower end of said closure which can be lowered to said floor means by rotation of said closure relative to said bracket means to detach said closure from said bracket means and on which said closure can then be rolled away from said doorway to provide clear access to said doorway.

2. A closure system as defined in claim 1 wherein the closure is of the plug fitting type.

3. A closure system which comprises the combination of a removable closure, bracket means for detachably securing the lower end of said closure to a fixedly located structural means subjacent the bottom of a doorway which is adapted to be blocked by said closure in a first relationship in which said closure is fixed to said bracket means and can be manipulated relative thereto to respectively block and unblock said doorway, means for removably latching said bracket means to said structural means, and means incorporated in said bracket means for so detachably fixing said closure thereto that said closure can be detached from said bracket means to provide a second relationship between the closure and the bracket means in which the closure is separated from the bracket means by a procedure which requires only movement of said closure relative to said bracket means to go from said first relationship between said closure and said bracket means to said second relationship therebetween, whereby said closure can be removed from said bracket means by mechanical manipulation of the closure relative to the bracket means and taken from the vicinity of the doorway to an out-of-the-way location and said bracket means can then be independently detached from said structural means and relocated to provide a clear pathway to said doorway.

4. An aircraft comprising: a fuselage having a vertically extending wall with a doorway therein and a floor extending inwardly from said wall and a closure system including: an inwardly opening door for blocking said doorway and means for so fixing said door to said fuselage that it can be detached therefrom and stowed in an out-of-the-way location removed from said doorway to thereby promote movement through said doorway, the means for detachably fixing said closure to said aircraft fuselage including bracket means for detachably securing the lower end of said closure to the floor of the fuselage with the closure blocking said doorway and wheel means fixed directly to the lower end of said closure and supported from said bracket means on which said closure can be rolled across said floor away from said doorway to an out-of-the-way location to thereby promote movement through said doorway.

5. An aircraft comprising: a fuselage having a vertically extending wall with a doorway therein, a floor extending inwardly from said wall, and a closure system including: an inwardly opening door for blocking said doorway and means for so fixing said door to said fuselage that it can be detached therefrom and stowed in an out-of-the-way location removed from said doorway to thereby promote movement through said doorway, said last-mentioned means including bracket means, means for detachably securing the lower end of said closure to said bracket means, and means for removably latching said bracket means to said floor, whereby said closure can be detached from said bracket means and removed to an out-of-the-way location removed from said doorway and said bracket means can then be removed from the aircraft floor to provide a clear path to said doorway, said bracket means comprising a pair of spaced apart, apertured stanchions and the means for detachably securing the lower end of the closure to the bracket means comprising a door supporting means which: (1) is fixed at said closure at the lower end thereof, (2) extends between and is receivable in the apertures in the stanchions, and (3) can be disengaged from said stanchions by a procedure which involves only manipulation of said closure relative to said bracket means.

6. An aircraft as defined in claim 5 wherein the closure system includes keeper means fixed to and not above the upper surface of said structural means to which said bracket means can be latched as aforesaid, said bracket means including latches at the opposite ends thereof which are adapted to cooperate with said keeper means to secure said bracket means to said structural means.

7. An aircraft as defined in claim 6 wherein each of the latches in the closure system includes a vertically movable stem and a retainer at the lower end of the stem, said keeper means having an upwardly opening channel which is configured to receive the latch element retainers, the top wall of said keeper means being a keyway having adjacent portions which are respectively configured to trap the retainers at the lower ends of said latch element stems therebeneath and to permit said retainers to be displaced upwardly and out of said channel, said latching means each further including a vertically pivotable lever and means pivotally connecting one end of said lever to the stem of the latch element, there being means so formed at said one end of each lever that, as the latter is respectively rotated to horizontal and vertical positions, said retainer is displaced upwardly to lock it against the top wall of said keeper to secure said bracket means to said structural means and displaced downwardly away from said keeper top wall to free the latch element from said top wall and permit said bracket to be so displaced along said keeper means as to align said retainers with the openings designed to have the retainers displaced therethrough, thereby allowing said bracket means to be detached from said structural means as aforesaid.

8. An aircraft as defined in claim 5 wherein said closure system has means at the upper end of the closure for detachably latching said closure to said fuselage wall.

9. An aircraft as defined in claim 5 wherein said door-supporting means is rotatable in the stanchions and wherein said closure system further includes wheel means which is journalled on said door-supporting means and can be so lowered into engagement with the floor of the aircraft fuselage as to accommodate the subsequent disengagement of said door-supporting means from said stanchions.

10. A closure system for a structure having a vertically extending wall with a doorway therein and floor means extending from said wall means at the lower edge thereof, said closure system comprising: a closure for blocking said doorway, bracket means for detachably securing the lower end of said closure to said floor means with said closure blocking said doorway, wheel means fixed to the lower end of said closure which can be lowered to said floor means and on which said closure can then be rolled away from said doorway to provide clear access to said doorway, horizontally spaced apart wheel spaced apart wheel supports fixed to said closure at the lower end thereof, a horizontally oriented axle extending through said wheel means and rotatably supporting said wheel means from said supports, and closure supporting lugs fixed to the aforesaid wheel supports and extending in opposite directions therefrom along a horizontal axis parallel to, but spaced from, the axis of rotation of said wheel means, said closure supporting bracket means having a pair of horizontally spaced apart, vertically extending stanchions for pivotally supporting the horizontally extending closure supporting lugs, formed therein, and said recesses having lug engageable surfaces so configured that, upon inward pivotal movement of said closure on said lugs, said wheel means is cammed downwardly into engagement with said floor means to make said closure rollable therealong and said closure supporting lugs are thereafter rotated upwardly and inwardly about a pivot provided by said wheel means to free said lugs from said stanchions.

11. A closure system which comprises the combination of: a removable closure; bracket means for detachably securing the lower end of said closure to structural means subjacent the bottom of a doorway which is adapted to be blocked by said closure; means for removably latching said bracket means to said structural means, whereby said closure can be detached from said bracket means and removed from the vicinity of the doorway to an out-of-the-way location and said bracket means can then be detached from said structural means and relocated to provide a clear pathway to said doorway; wheel means fixed to the lower end of said closure which can be lowered onto said structural means and on which said closure can then be rolled away from said doorway to an out-of-the-way location to promote access to said doorway; horizontally spaced apart wheel supports fixed to said closure at the lower end thereof; a horizontally oriented axle extending through said wheel means and rotatably supporting said wheel means from said supports; closure supporting lugs fixed to the aforesaid wheel supports and extending in opposite directions therefrom along a horizontal axis parallel to, but spaced from, the axis of rotation of said wheel means, said closure securing bracket means having a pair of horizontally spaced apart, vertically extending stanchions, there being recesses for the horizontally extending, closure supporting lugs formed in said stanchions and said recesses having lug engageable surfaces so configured that, upon inward pivotal movement of said closure on said lugs, said wheel means is cammed downwardly into engagement with said structural means to make said wheel means rollable therealong.

12. An aircraft comprising: a fuselage having a vertically extending wall with a doorway therein and a floor extending inwardly from said wall and a closure system including: an inwardly opening door for blocking said doorway and means for so fixing said door to said fuselage that it can be detached therefrom and stowed in an out-of-the-way location removed from said doorway to thereby promote movement through said doorway, the means for detachably fixing said closure to said aircraft fuselage including: bracket means for detachably securing the lower end of said closure to the floor of the fuselage with the closure blocking said doorway; wheel means fixed said to the lower end of said closure on which said closure can be rolled across said floor away from said doorway to an out-of-the-way location to thereby promote movement through said doorway; horizontally spaced apart wheel supports fixed to said closure at the lower end thereof; a horizontally oriented axle extending through and rotatably supporting said wheel means from said supports; and closure supporting lugs fixed to the aforesaid wheel supports and extending in opposite directions therefrom along a horizontal axis parallel to, but spaced from, the axis of rotation of said wheel means, said closure securing bracket means having a pair of horizontally spaced apart, vertically extending stanchions and there being recesses in said stanchions which have lug-engageable surfaces so configured that, upon inward pivotal movement of said closure on said lugs, said wheel means is cammed downwardly into engagement with the floor of said fuselage to make said closure rollable therealong and said closure members are thereafter rotated upwardly and inwardly about a pivot provided by said wheel means to free said lugs from said stanchions.

13. A closure system which comprises the combination of a removable closure, bracket means from which said closure is detachable for securing the lower end of said closure to structural means subjacent the bottom of a doorway which is adapted to be blocked by said closure, means for removably latching said bracket means to said structural means, and wheel means fixed to the lower end of said closure which can be so lowered onto said structural means as to rollingly engage said wheel means with said structural means and to detach said closure from said bracket means, whereby: (1) said closure can be detached from said bracket means and rolled on said wheels means from the vicinity of the doorway to an out-of-the-way location, and (2) said bracket means can then be removed from said structural means and relocated to provide a clear pathway to said doorway.

* * * * *